US010398083B2

United States Patent
Rotole et al.

(10) Patent No.: US 10,398,083 B2
(45) Date of Patent: Sep. 3, 2019

(54) MULTI HEAD WINDROWER

(71) Applicant: DEERE & COMPANY, Moline, IL (US)

(72) Inventors: David V. Rotole, Bloomfield, IA (US); Kyle R. Teach, Ottumwa, IA (US); Kyle A. Shipley, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 786 days.

(21) Appl. No.: 14/848,781

(22) Filed: Sep. 9, 2015

(65) Prior Publication Data
US 2017/0064905 A1    Mar. 9, 2017

(51) Int. Cl.
*A01D 41/14*    (2006.01)
*A01D 41/16*    (2006.01)
*A01B 59/06*    (2006.01)

(52) U.S. Cl.
CPC ........... *A01D 41/14* (2013.01); *A01B 59/064* (2013.01); *A01D 41/16* (2013.01)

(58) Field of Classification Search
CPC ...... A01D 41/14; A01D 41/16; A01D 41/145; A01D 33/14; A01D 34/662; A01B 59/064; A01B 59/04; A01B 59/048; A01B 59/066–068; A01B 59/06; A01B 35/10
See application file for complete search history.

(56) References Cited

U.S. PATENT DOCUMENTS

| | | | | |
|---|---|---|---|---|
| 3,066,952 A | * | 12/1962 | Price | A01B 59/002 172/248 |
| 3,324,637 A | * | 6/1967 | Windsor | A01D 41/16 56/15.6 |
| 3,650,096 A | | 3/1972 | Caldwell | |
| 3,958,399 A | * | 5/1976 | Schoeneberger | A01D 41/14 56/14.4 |
| 4,202,154 A | * | 5/1980 | Waldrop | A01D 41/16 56/15.6 |
| 4,206,582 A | | 6/1980 | Molzahn et al. | |
| 4,212,144 A | * | 7/1980 | Raineri | A01D 41/14 56/15.8 |
| 4,409,780 A | | 10/1983 | Beougher et al. | |
| 4,519,623 A | * | 5/1985 | Orthman | A01B 59/068 172/439 |

(Continued)

FOREIGN PATENT DOCUMENTS

CA    1075914 A  *  4/1980  ............. A01D 41/14

*Primary Examiner* — Thomas B Will
*Assistant Examiner* — Joan D Misa
(74) *Attorney, Agent, or Firm* — Taft Stettinius & Hollister LLP; Stephen F. Rost (57) ABSTRACT

A windrower with a frame at a front end of the windrower and a cab coupled to the frame. The cab has a plurality of controls disposed in the cab for controlling the windrower. The windrower also has a lift arm with a first end and a second end, the first end being pivotally coupled to the frame, wherein the lift arm includes a transverse bend defined at a location between the first and second ends. A first coupler is coupled to the second end of the lift arm and a second coupler coupled to the lift arm between the first and second ends. The first coupler is configured to couple the frame to a rotary-style head and the second coupler is configure to couple the frame to a draper-style head.

13 Claims, 8 Drawing Sheets

(56) References Cited

U.S. PATENT DOCUMENTS

| | | | | |
|---|---|---|---|---|
| 4,715,770 | A * | 12/1987 | Kryscyk | A01B 59/048 172/443 |
| 4,899,831 | A * | 2/1990 | Schillings | A01B 59/064 172/439 |
| 5,157,905 | A * | 10/1992 | Talbot | A01D 41/14 56/15.9 |
| 5,535,578 | A * | 7/1996 | Honey | A01D 41/145 56/14.9 |
| 5,542,477 | A * | 8/1996 | DeFrancq | A01B 59/048 172/273 |
| 6,050,075 | A * | 4/2000 | Waldrop | A01D 87/0053 56/15.9 |
| 6,062,321 | A * | 5/2000 | Defrancq | A01B 59/048 172/448 |
| 6,073,431 | A * | 6/2000 | Osborne | A01D 41/16 56/15.7 |
| 6,089,328 | A * | 7/2000 | Moore | A01B 59/068 172/439 |
| 6,609,575 | B1 * | 8/2003 | Crabb | A01B 59/004 172/439 |
| 6,655,468 | B2 * | 12/2003 | Casali | A01B 59/004 172/439 |
| 6,796,384 | B1 * | 9/2004 | Potter | A01B 59/068 172/439 |
| 7,603,837 | B2 * | 10/2009 | Ehrhart | A01D 34/283 56/10.2 E |
| 8,511,052 | B2 | 8/2013 | Dow et al. | |
| 2007/0289756 | A1 * | 12/2007 | Kapfer | A01B 59/064 172/239 |
| 2010/0043368 | A1 | 2/2010 | Sloan et al. | |
| 2016/0128261 | A1 * | 5/2016 | Figger | A01B 59/006 56/10.1 |
| 2016/0165796 | A1 | 6/2016 | Agco | |

* cited by examiner

MULTI HEAD WINDROWER

FIELD OF THE DISCLOSURE

The present disclosure relates to a tractor or other work machine, and in particular, to a head coupling system for use with the tractor or other work machine to couple different heads thereto.

BACKGROUND OF THE DISCLOSURE

An agricultural work machine such as a combine or windrower is frequently used to harvest a variety of crops from a field. A combine or windrower often has a special head coupled to the work machine at a front end. The head is specifically designed to correspond with the particular crop being cut and distributed by, the head. One type of head is a draper head that has a belt located behind the cutting blade. As the crop is cut, the crop is positioned onto the belt to be further manipulated and prepared by the work machine.

While the draper head is commonly used on a windrower or combine, many types of crop require a rotary head instead. A rotary head often has a cutter bar that has several rotating cutting units therealong. Once the crop is cut, the rotary head manipulates the cut crop to become aligned in a desired location or further processes through a conditioner.

The draper head and the rotary head may have separate mounting locations disposed along the front of the work machine. The mechanical and hydraulic demands for the work machine are similar for a draper head and a rotary head but an entirely separate work machine is often used for each application.

SUMMARY

In one embodiment, a windrower may include a frame at a front end. The windrower may have a cab coupled to the frame and a plurality of controls disposed in the cab for controlling the windrower. A lift arm may be coupled to the frame and have a first end and a second end, the first end being pivotally coupled to the frame. The lift arm may have a transverse bend defined at a location between the first and second ends. A first coupler may be coupled to the second end of the lift arm and a second coupler may be coupled to the lift arm between the first and second ends. The first coupler may be configured to couple the frame to a rotary-style head and the second coupler is configured to couple the frame to a draper-style head.

In another embodiment, a windrower may include a frame at a front end of the windrower. A cab may be coupled to the frame and a plurality of controls may be disposed in the cab for controlling the windrower. Further, a lift arm having a first end and a second end may be pivotally coupled to the frame at the first end. The lift arm may include a transverse bend defined at a location between the first and second ends. Further, a first coupler may be coupled to the second end of the lift arm and a second coupler may be coupled to the lift arm between the first and second ends. An upper link bracket may also be coupled to the frame at the front end. An upper link may be coupled to the upper link at a first end and may have a second end with an upper link coupler, the upper link may have a first length and a second length. Further, the first coupler and the upper link coupler may be configured to couple the frame to a rotary-style head when the upper link is the first length and the second coupler and upper link coupler may be configure to couple the frame to a draper-style head when the upper link is the second length.

In yet another embodiment, a windrower system may include a work machine with a cab and a frame at a front end. A control panel may be disposed within the cab. Further, a link arm assembly may be coupled to the frame and have a draper coupler and a rotary coupler coupled thereto, both the draper coupler and the rotary coupler having a couple position and a release position. An upper link may be coupled to the frame on a first end and have a head coupler on a second end, the head coupler may be configured to be selectively positioned in a close position or an open position. A head may be selectively coupled to the frame by the link arm and the upper link.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a topside view of one lift arm of the work machine of FIG. 1a;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1A:
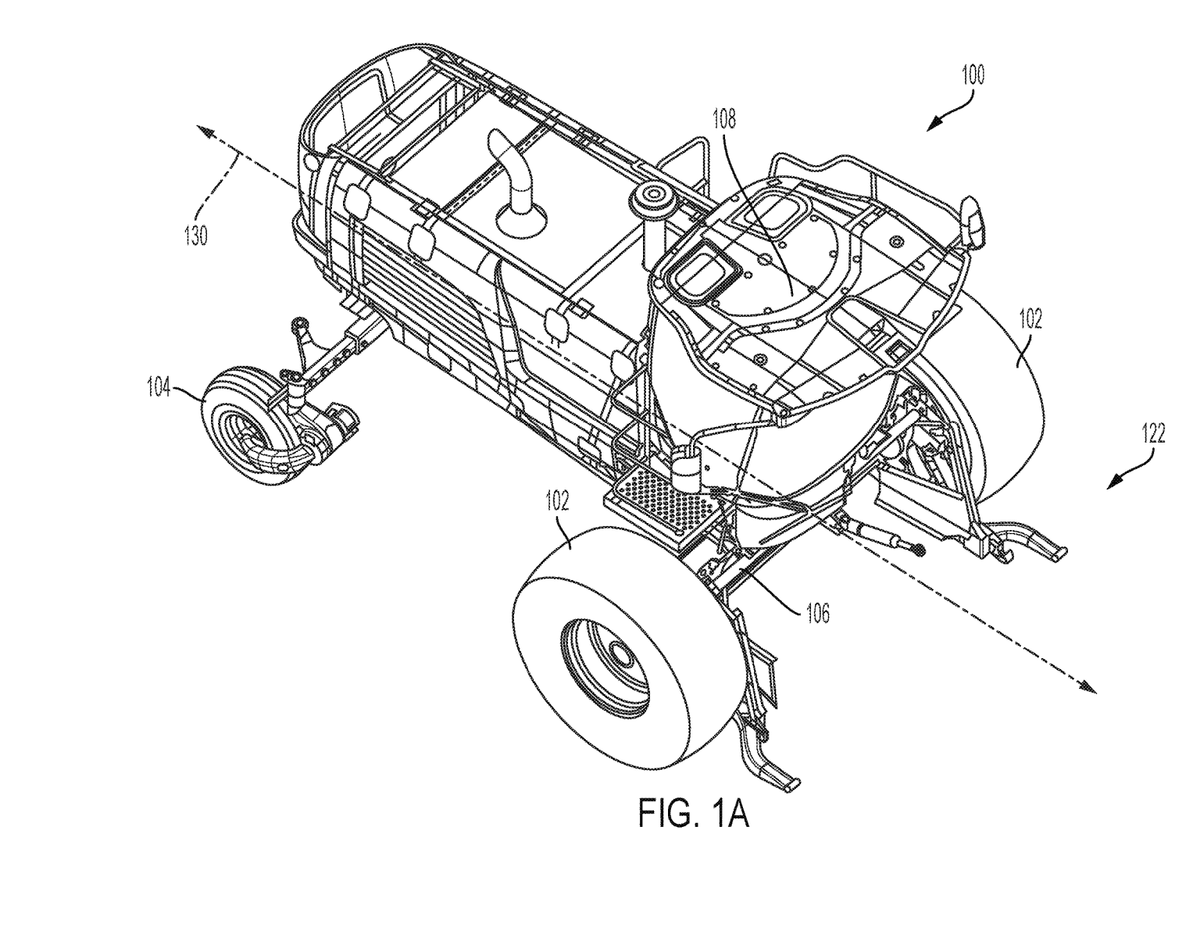
FIG. 1a is an elevated perspective view of a work machine with no head coupled thereto.

With reference to FIG. 1a, an elevated perspective view of a work machine 100 with no head coupled thereto is shown. The work machine 100 may have at least one power unit that provides mechanical, electrical, and/or hydraulic power to the work machine 100. In one embodiment, the power unit provides power to rotate a pair of drive wheels 102 coupled to a frame 106 of the work machine 100. The drive wheels 102 may rotate relative to the work machine 100 to allow the work machine 100 to traverse the underlying surface. The work machine 100 may also define an axis of travel 130 disposed lengthwise through a central portion of the work machine 100. The work machine 100 may remain aligned with the axis of travel 130 when moving in a substantially straight direction.

In addition to drive wheels 102, the embodiment shown in FIG. 1a has a pair of swivel caster wheels 104. The caster wheels 104 may pivot freely about a mount to allow the work machine 100 to rotate as directed by the powered drive wheels 102. However, the particular configuration of the drive wheels 102 and caster wheels 104 should not be limiting. In a different embodiment, there may be no wheels at all. Rather, the power unit may provide power to a pair of tracks to allow the work machine to traverse the underlying surface. In yet another embodiment, the caster wheels 104 may not be swivel caster wheels but rather be wheels coupled to an axle and configured to be mechanically coupled to the power unit.

The work machine 100 may also have a cabin 108 coupled to the frame 106. The cabin 108 may house a plurality of controls (not shown) that allow a user to control the various systems of the work machine 100. In one non-exclusive embodiment, the plurality of controls allows the user to control mechanical, electrical, and hydraulic systems of the work machine 100.

Figure 1B:
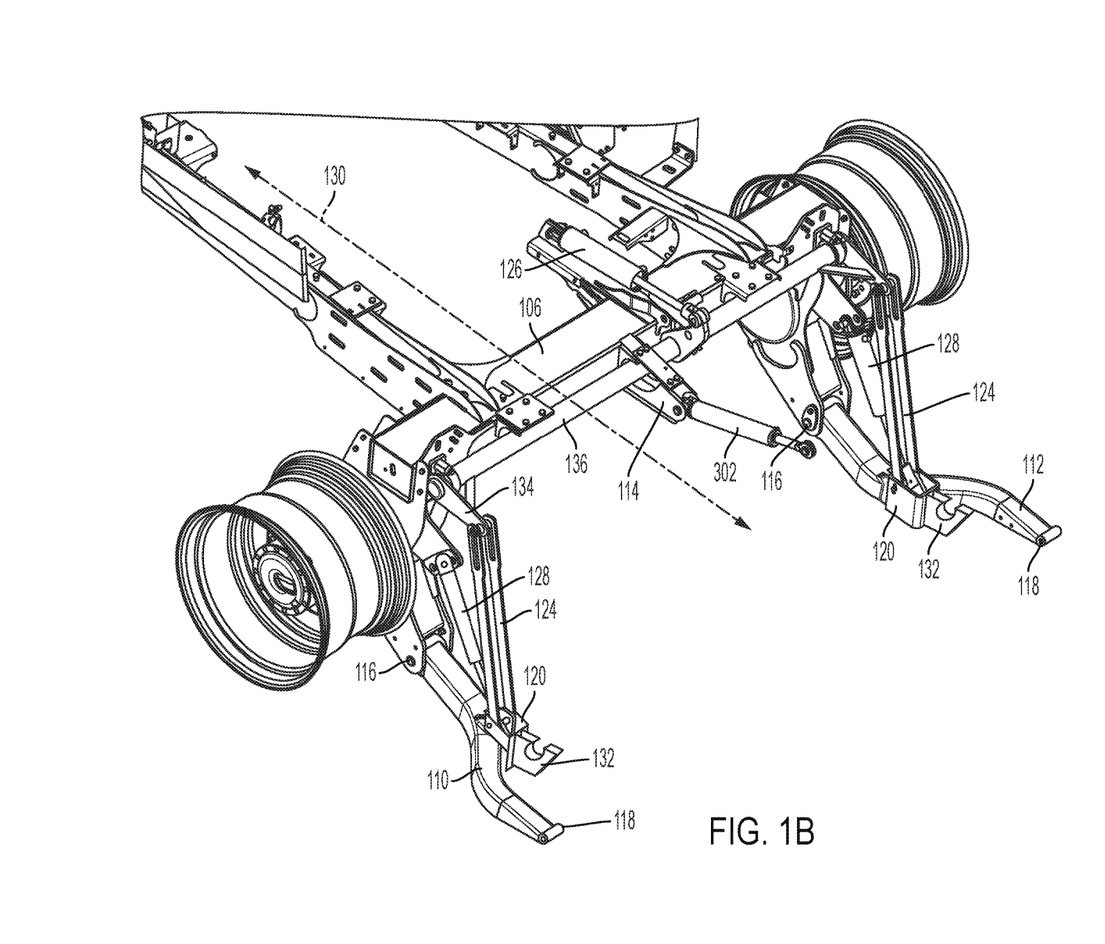
FIG. 1b is a partial elevated perspective view of the work machine of FIG. 1a, with several components removed.

FIG. 1b more clearly illustrates mounting locations for a head (head not shown in FIG. 1a or FIG. 1b). More particularly, a first lift arm 110, a second lift arm 112, an upper bracket 114, and an upper link 302 are shown in FIG. 1b. The first and second lift arm 110, 112, along with the upper bracket 114, may sufficiently couple to control both the height of the head relative to the underlying surface as well as the angle of the head relative to the work machine 100.

In one embodiment, each lift arm 110, 112 may be pivotally coupled to the work machine 100 at a first pivot 116. The first pivot 116 may be located at a proximal portion of each lift arm 110, 112 relative to the frame 106. Further, each lift arm 110, 112 may extend away from the first pivot 116 towards a front end 122 of the work machine 100. Each lift arm 110, 112 may have a first coupler 118 defined at a distal end of the respective lift arm 110, 112. Each lift arm 110, 112 may also have a second coupler 120 coupled to the respective lift arm 110, 112 at a location between the first pivot 116 and the second coupler 120. In one embodiment, the second coupler 120 may have a latching mechanism 132 coupled thereto that can be disposed in either a latch position or a release position.

When a head is coupled to the lift arms 110, 112, at least one float cylinder 128 may be coupled between the frame 106 and the first and second lift arms 110, 112. More specifically, a link arm 124 may be pivotally coupled to each lift arm 110, 112 on one end and to a cam pivot arm 134 on the other. The cam pivot arm 134 may be mechanically coupled to a lift arm axle 136 that may be rotated by a lift cylinder 126. When the lift cylinder 126 rotates the lift arm axle 136, the pivot arm 134 may rotate therewith and pull respective lift arm 110, 112, with the respective link arm 124.

In one embodiment, the lift cylinder 126 pivots the lift arms 110, 112 between a raised, and a lowered position. The lift cylinder 126 may also allow for adjusting the height of the head when the head is in the lowered position. In this embodiment, the lift cylinder 126 may control the height of the head relative to the underlying surface while the float cylinders 128 may be coupled to each lift arm 110, 112 to reduce a contact force generated when the head contacts the underlying surface. More specifically, the float cylinders 128 may provide a biasing force on the lift arms 110, 112 away from the underlying surface. When the lift arms 110, 112 are coupled to the head, the lift cylinder 126 may position the head the desired height away from the underlying surface. The float cylinders 128 may provide the biasing force on the lift arms 110, 112 so the head may more easily rise relative to the underlying surface if it contacts an obstacle thereon. Further, the float cylinders 128 may allow the user to adjust the biasing force of the head relative to the underlying surface by increasing or decreasing a load carrying capacity of the respective lift arms 110, 112.

In one embodiment, the link arm 124 may be pivotally coupled to the cam pivot arm 134 by a pin disposed in a slot of the link arm 124. The slotted engagement allows the lift cylinder 126 to transition the lift arms 110, 112 to a lowered position (where the pin is at an uppermost portion of the slot) and allow the float cylinders 128 to provide the biasing force to the head to allow the head to move away from the underlying surface should it contact an obstacle thereon. More specifically, when the pin is in the upper portion of the slot, and the head contacts an obstacle along the underlying surface, the float cylinders 128 can provide the biasing force to assist raising the head over the underlying obstacle. Further, as the head is raised over the underlying obstacle, the pin may transition towards a lower portion of the slot. Once the obstacle has been fully traversed, the pin my return to the top portion of the slot and the height of the head may be maintained by the cylinder 126.

Figure 2:
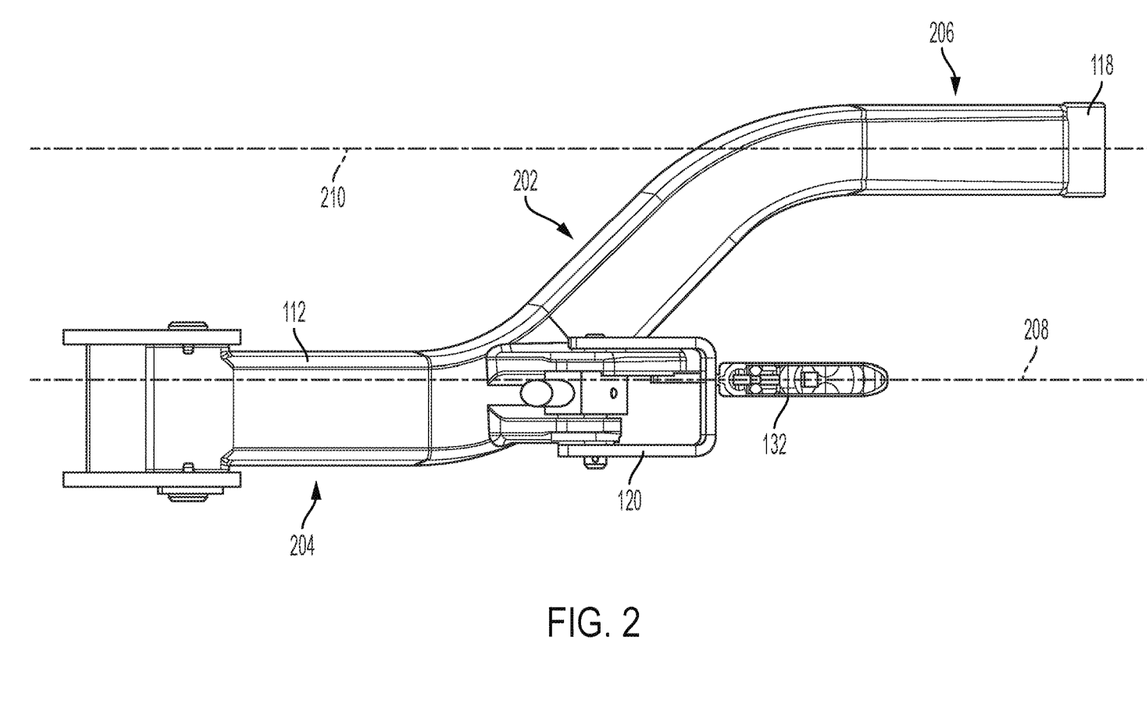

FIG. 2 is a topside view of the lift arm 112. More specifically shown in FIG. 2 is a transverse bend 202 defined in the lift arm 112 as it extends away from the frame 106. Further, the lift arm 112 may have a first portion 204 and a second portion 206 offset from one another and connected through the transverse bend 202. In one embodiment, the first portion 204 may be substantially aligned with a first axis 208 and the second portion 206 may be substantially aligned with a second axis 210. In one embodiment, the first and second axis 208, 210 may be substantially parallel to one another and the transverse bend 202 may transition from the first axis 208 to the second axis 210 to couple the first portion 204 to the second portion 206.

In one embodiment, the first portion 204, the transverse bend 202, and the second portion 206 may be integrally formed from a single material. In a different embodiment, each of the first portion 204, the transverse bend 202, and the second portion 206 may be formed of a different segment of material and coupled to one another through any of a plurality of coupling mechanisms such as welds, bolts, rivets, and the like. Further, while one embodiment has been described to have a first portion 204 that is substantially parallel to a second portion 206, in a different embodiment the first portion 204 may be angularly offset from the second portion 206.

In one embodiment, the first axis 208 may be disposed closer to the axis of travel 130 than the second axis 210. That is to say, the transverse bend 202 extends away from the axis of travel 130 as it couples the first portion 204 to the second portion 206. In one non-limiting embodiment, the first coupler 118 is disposed along the second axis 210 while the second coupler 120 is disposed along the first axis 208.

Figure 3:
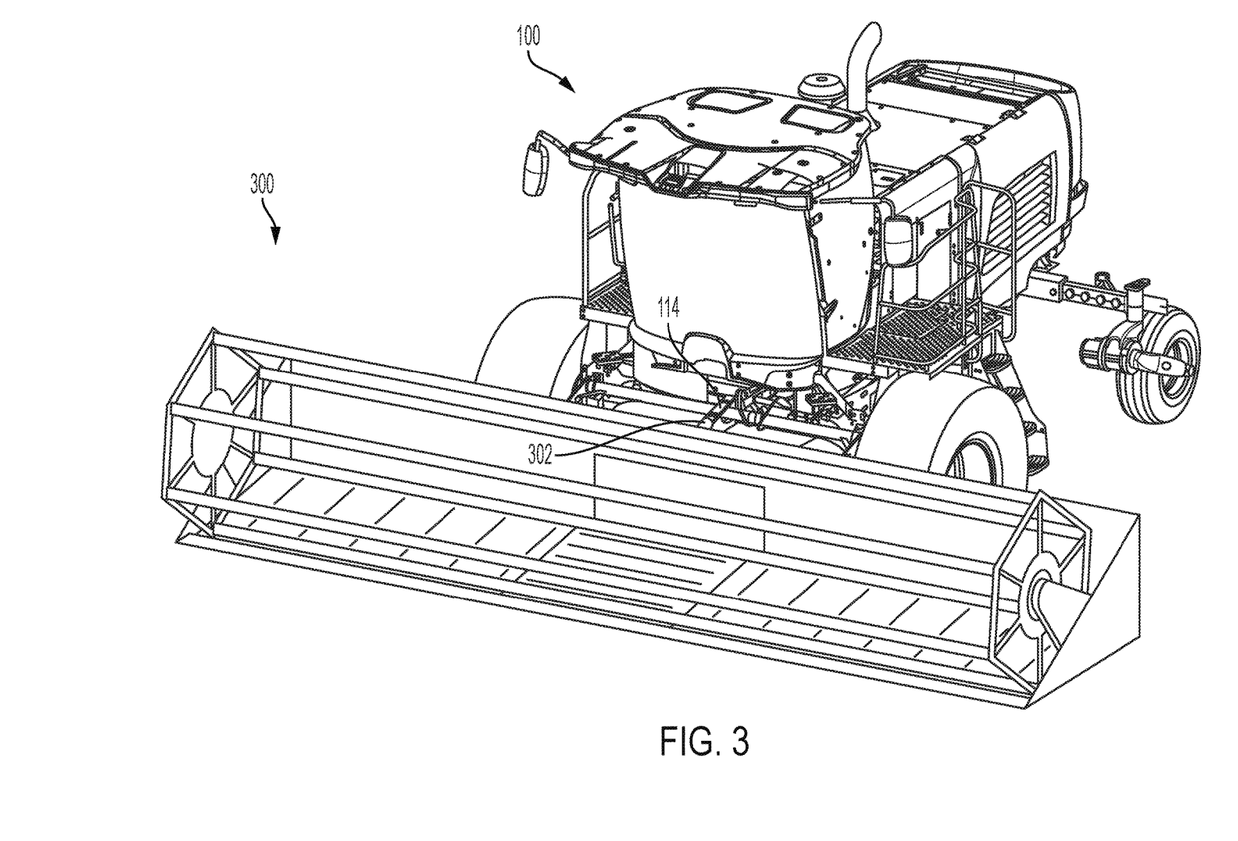
FIG. 3 is an elevated perspective view of the work machine of FIG. 1a with a draper head coupled thereto.

Referring now to FIG. 3, a work machine 100 with a draper head 300 is shown. The draper head 300 may be coupled to the work machine 100 by the second coupler 120 of the respective first and second lift arm 110, 112. Further, the draper head 300 may also be coupled to the upper bracket 114 through the upper link 302. In one embodiment, the upper link 302 may be a hydraulic cylinder that may be selectively actuated by the user through the plurality if controls. The upper link 302 may be pivotally coupled to the upper bracket 114 on a base end and pivotally coupled to a head mount (not shown) on a head end.

In one embodiment, the user may selectively actuate the upper link 302 to alter the overall length of the upper link 302. In this embodiment, if the upper link 302 is actuated by the user to become longer, the draper head 300 may rotate in a downward direction relative to the work machine 100. More specifically, as the upper link 302 extends, the portion of the draper head 300 towards the front end 122 is pivoted towards the underlying surface. Alternatively, if the upper link 302 is actuated by the user to become shorter, the draper head 300 may rotate in an upward direction relative to the work machine 100. More specifically, as the upper link 302 contracts, the portion of the draper head 300 towards the front end 122 is pivoted away from the underlying surface.

Figure 4:
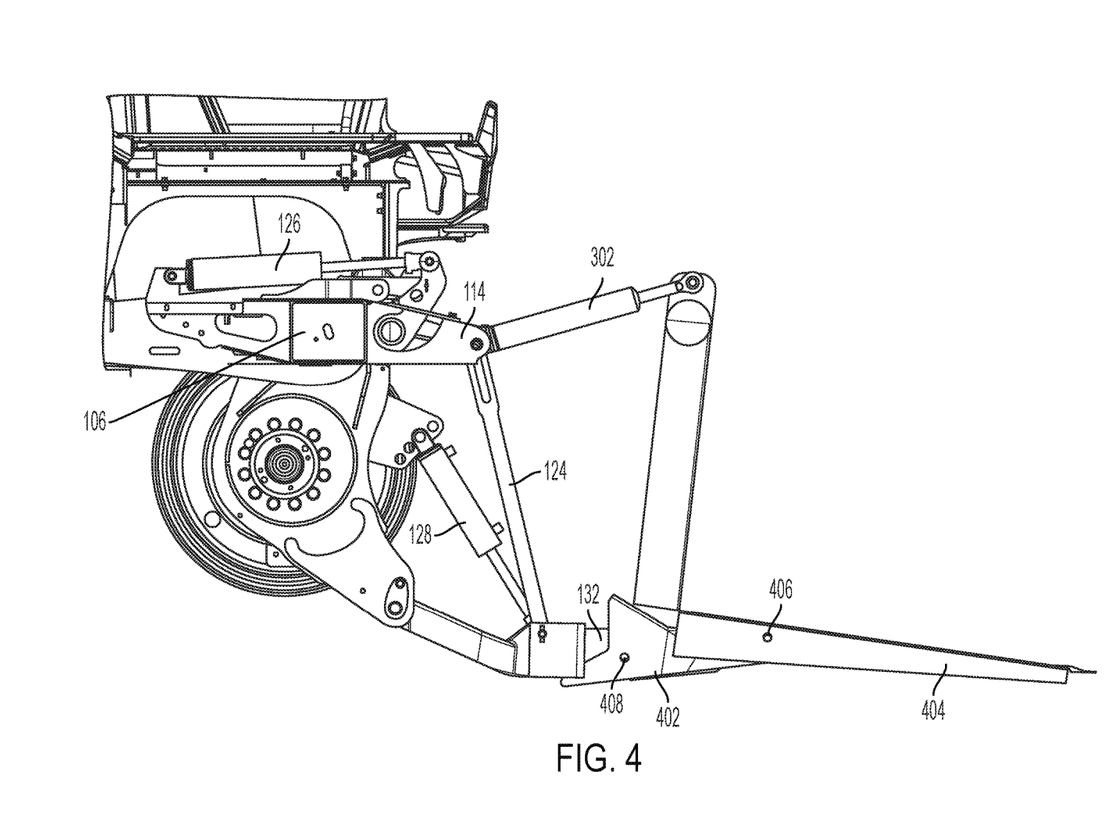
FIG. 4 is a partial side view of the work machine of FIG. 3.

As will become more apparent with reference to FIG. 4, the draper head 300 may be coupled to the latching mechanism 132 through one or more intermediate couplers 402. The intermediate couplers 402 may be coupled to the draper head 300 through a draper frame 404 and positioned to align with the first and second lift arm 110, 112. The intermediate coupler 402 may have a substantially U-shaped cross-section that can receive a portion of latching mechanism 132 therein when coupled to the work machine 100. The draper frame 404 may also be coupled to the intermediate coupler 402 through a bottom pin 406. In one embodiment, the bottom pin 406 allows the draper head 300 to rotate about the bottom pin 406 as the length of the upper link 302 is altered as explained in more detail above. While an intermediate coupler 402 has been described in detail, any coupling mechanism may also work. In one embodiment, the intermediate coupler 402 may be a boot or any other similar intermediary coupler.

The intermediate coupler 402 may also have a latch pin 408 disposed therein. The latch pin 408 may extend through a portion of the U-shaped intermediate coupler 402 to provide a location for the latching mechanism 132 to removeably couple to the intermediate coupler 402. When the latching mechanism 132 is coupled to the intermediate coupler 402, it may be at least partially disposed within the interior region of the U-shaped cross section of the intermediate coupler 402. When the latching mechanism 132 is in the latch position, the intermediate coupler 402 may be mechanically coupled to the respective lift arm 110, 112 through the latch pin 408. Alternatively, when the latching mechanism 132 is disposed in the release position, the respective lift arm 110, 112 may not be mechanically coupled to the intermediate coupler 402.

Figure 5:
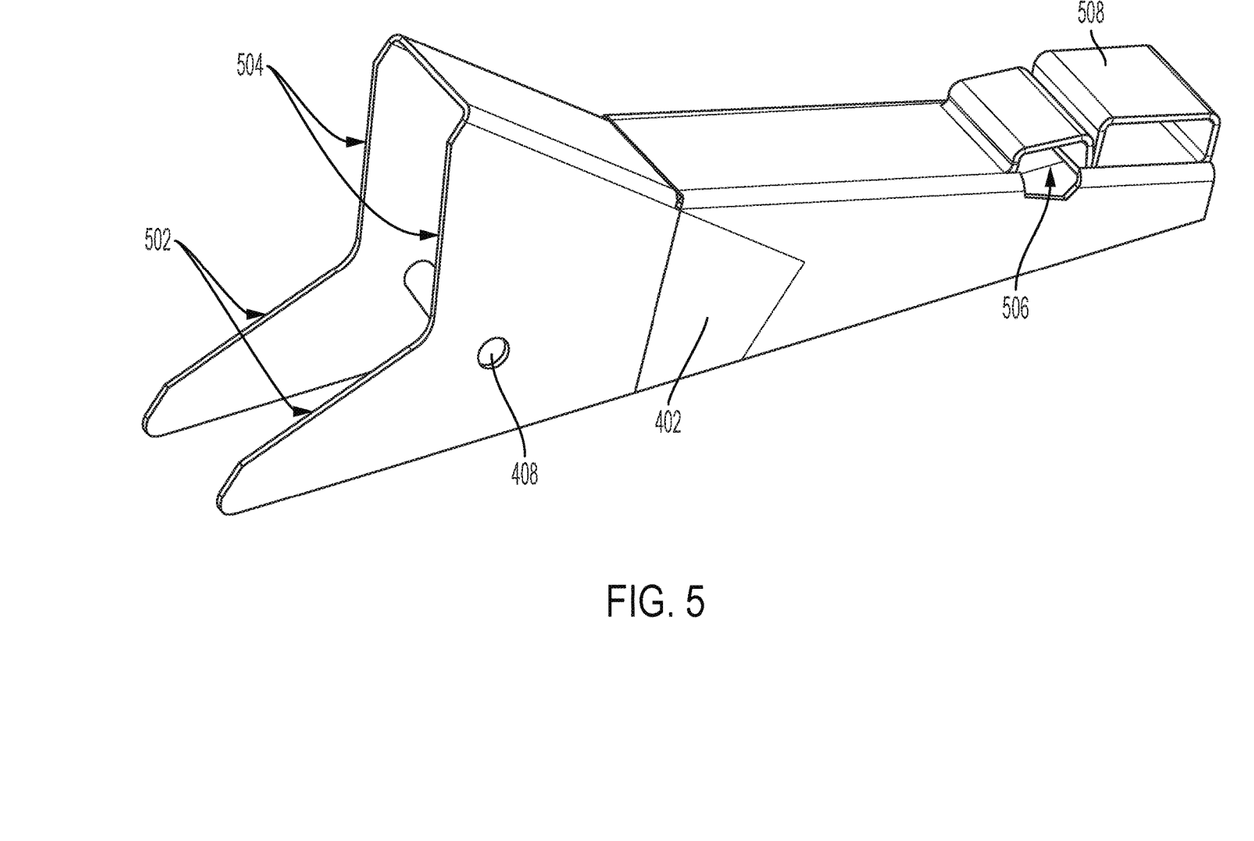
FIG. 5 is an elevated perspective view of an intermediate coupler.

The intermediate coupler 402 is shown in more detail in FIG. 5. In one embodiment, the intermediate coupler 402 has a guide surface 502 defined at a portion of the intermediate coupler 402 that extends away from the draper frame 404 when coupled thereto. The guide surface 502 may guide the latching mechanism 132 towards the latch pin 408 as the respective lift arm 110, 112 becomes aligned with the intermediate coupler 402.

In addition to the guide surface 502, the intermediate coupler 402 may also have a stop surface 504 defined therein. The stop surface 504 may be defined in the intermediate coupler 402 to contact the second coupler 120 when the latching mechanism 132 is coupled to the latch pin 408. The guide surface 502 and the stop surface 504 may substantially restrict the intermediate coupler 402 from rotating or otherwise moving relative to the respective lift arm 110, 112 when the latching mechanism 132 is coupled to the latch pin 408.

As mentioned above, the draper head 300 may rotate about the bottom pin 406 when the draper head 300 is coupled to the work machine 100. The frame 404 may be pivotally coupled to each respective intermediate coupler 402 through the bottom pin 406. Further, the bottom pin 406 is positioned through a pin aperture 506 defined in the intermediate coupler 402. The pin aperture 506 may be sized to allow the bottom pin 406 to pivotally couple the frame 404 to the intermediate coupler 402. In one non-limiting example, when the frame 404 is coupled to the intermediate coupler 402 by positioning the bottom pin 406 through the pin aperture 506, and the intermediate coupler 402 is coupled to the latching mechanism 132, the draper head 300 may pivot about the bottom pin 406 and change angular orientation relative to lift arms 110, 112 when the length of the upper link 302 is altered by the user.

The intermediate coupler 402 may also have a stop surface 508 defined therein. The stop surface 508 may have a rubber, or other material capable of elastic deformation, coupled thereto. The stop surface 508 may substantially dampen any inputs, such as vibrations, between the frame 404 and the intermediate coupler 402. In addition to being a material with elastic properties, a mechanical spring or dampener could also be utilized at the stop surface 508 to dampen the movement of the frame 404 relative to the intermediate coupler 402 and this disclosure should not be limited to any particular material or assembly.

Figure 6:
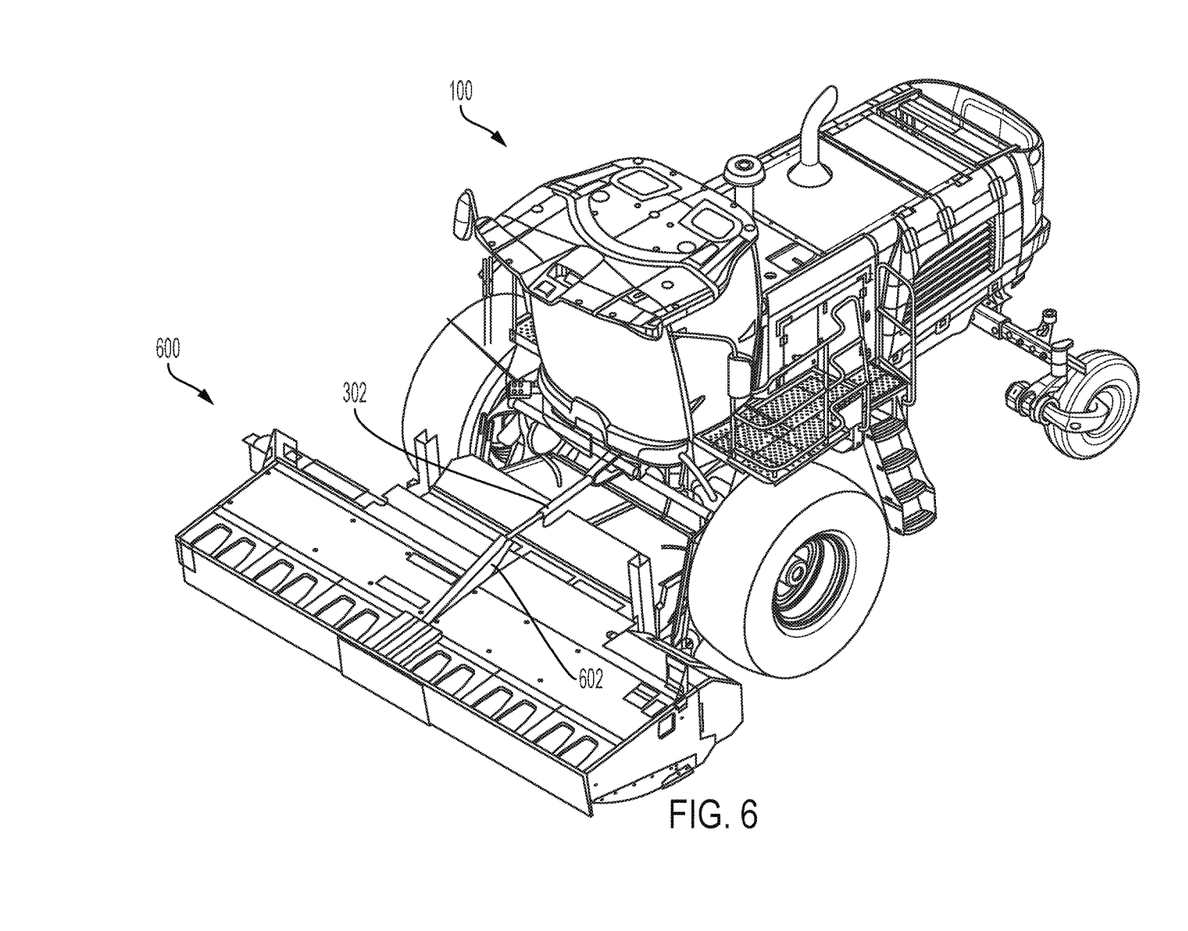
FIG. 6 is an elevated perspective view of a work machine of FIG. 1a with a rotary head coupled thereto.

Referring now to FIG. 6, a work machine 100 with a rotary head. 600 is shown. The rotary head 600 may be coupled to the work machine 100 through the lift arms 110, 112 and the upper link 302. However, the rotary head 600 may be coupled to the lift arms 110, 112 at the respective first coupler 118 instead of being coupled to the respective second coupler 120 like the draper head 300.

FIG. 6 more clearly shows how the rotary head 600 is coupled to the work machine 100. More specifically, the upper link 302 may pivotally couple the upper bracket 114 to a rotary bracket 602. The upper link 302 may control the angular orientation of the rotary head 600 relative to the underlying surface in a similar manner as described in more detail above for the draper head 300. Accordingly, the features described above for the upper link 302 are equally applicable here and are considered incorporated herein for the rotary head 600.

Figure 7:
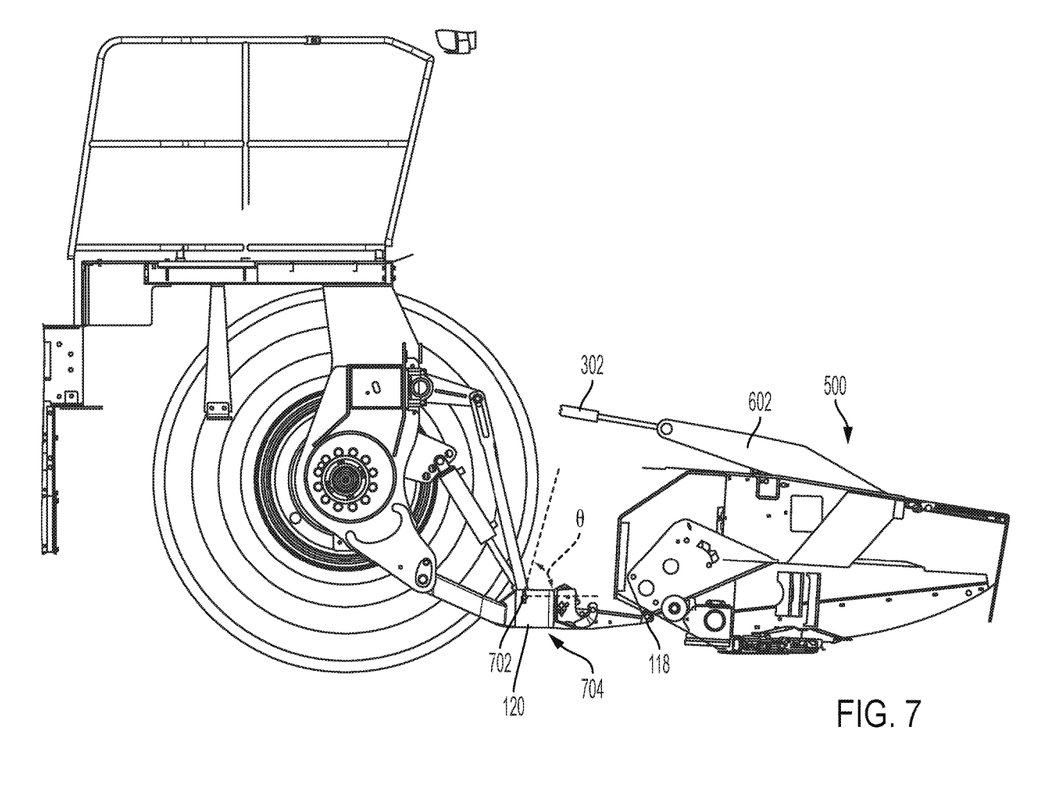
FIG. 7 is a partial side view of the work machine of FIG. 6.

Referring now to FIG. 7, the first coupler 118 is shown pivotally coupled to the rotary head 600. In one embodiment, the first coupler 118 can couple to the rotary head 600 without contacting the second coupler 120. In a different embodiment, the second coupler 120 may pivot to become disposed at a different location (not shown) along the respective lift arm 110, 112 to allow proper clearance of the rotary head 600. Further still, in one embodiment the first coupler 118 could be coupled to the rotary head 600 remotely from the cabin 108 via electrical, hydraulic, or pneumatic systems.

In the embodiment where the position of the second coupler 120 is altered to allow the proper clearance of the rotary head, the second coupler 120 may be pivotally coupled to the respective lift arm 110, 112 through a coupler pin 702. The coupler pin 702 may be disposed proximate to an edge of the second coupler 120 and further be coupled to a portion of the respective lift arm 110, 112. The pin 702 may pivotally couple the second coupler 120 to the respective lift arm 110, 112 to allow the second coupler 120 to rotate from a carry position 704 to a stow position (not shown). The second coupler 120 may rotate about the pin 702 an angle Θ relative to the respective lift arm 110, 112 to become oriented in the stow position. In this embodiment, before the rotary head 600 is coupled to the first coupler 118, the second coupler 120 is rotated the angle Θ to the stow position to allow the proper clearance for the rotary head 600. When the second coupler 120 is pivoted to angle Θ, the second coupler 120 and the rotary head 600 may not contact one another when the rotary head 600 is coupled to the lift arms 110, 112.

In one embodiment, remote coupling mechanisms (not shown) may be positioned at each of the first coupler 118, second coupler 120, and the upper link 302. In this embodiment, the user may use the plurality of controls to position each of the remote coupling mechanism in either a couple position or a release position. When the remote coupling mechanisms are in the release position, the user may orient the work machine 100 to align with the desired head 300, 600.

In one example, the user may position the upper link 302 to be the proper length for coupling to the draper head 300. The user may then align the work machine 100 with the draper head 300 when the remote coupling mechanisms of the second coupler 120 and the upper link 302 are in the release position. When the latching mechanism 132 is properly aligned with the latch pin 408 of the intermediate coupler 402, and the upper link 302 is properly aligned with the head mount, the user may transition the remote coupling mechanisms to the couple position, thereby mechanically coupling the draper head 300 to the work machine 100.

Similarly, when the draper head 300 is coupled to the work machine 100, the user may position the draper head 300 on a carrier (not shown) or the underlying surface in preparation for removing the draper head 300. Once the draper head 300 is supported by the carrier or underlying surface, the user may use the plurality of controls to transition the remote coupling mechanisms of the second couplers 120 and the upper link 302 to the release position, thereby mechanically uncoupling the draper head 300 from the work machine 100.

In a different example utilizing the same work machine 100, the user may position the upper link 302 to a length that corresponds with the rotary head 600. The user may then align the work machine 100 with the rotary head 600 when the remote coupling mechanisms of the first coupler 118 and the upper link 302 are in the release position. When the first coupler 118 is properly aligned with the rotary head 600, and the upper link 302 is properly aligned with the rotary bracket 602, the user may transition the remote coupling mechanisms to the couple position, thereby mechanically coupling the rotary head 600 to the work machine 100.

Similarly, when the rotary head 600 is coupled to the work machine 100, the user may position the rotary head 600 on a carrier (not shown) or the underlying surface in preparation for removing the rotary head 600. Once the rotary head 600 is supported by the carrier or underlying surface, the user may use the plurality of controls to transition the remote coupling mechanisms of the first couplers 118 and the upper link 302 to the release position, thereby mechanically uncoupling the rotary head 600 from the work machine 100.

The remote coupling mechanisms could be any of a plurality of devices. In one embodiment, the remote coupling devices are hydraulically controlled latches that can be transitioned between the coupler position and the release position through hydraulic fluid. In a different example the remote coupling devices are electrically controlled through solenoids, motors, or other similar electrical components that transition the remote coupling devices between the couple position and the release position through electrical signals. In yet a different embodiment, pneumatic pressure may be utilized to transition the remote coupling devices between the couple and release position as is known in the art.

In a different embodiment, each of the remote coupling devices may be transitioned between the couple position and the release position mechanically. In this embodiment, the user would positioned the remote coupling mechanisms in the uncouple position prior to aligning the work machine 100 with the desired head 300, 600. Once the remote coupling mechanisms are properly aligned, the user would have to mechanically transition each of the remote coupling mechanisms to the couple position. Similarly, to remove the head 300, 600 the user would have to transition the remote coupling mechanisms to the uncouple position prior to moving the work machine 100 away from the head 300, 600.

In addition to controlling the remote coupling mechanisms, the plurality of controls may also control the angular orientation of the second coupler 120. As one non-limiting example, the user may indicate with the plurality of controls that the work machine 100 is going to be coupled to the rotary head 600. Once the user indicates this preference, the second coupler 120 may be transitioned Θ degrees relative to the respective lift arms 110, 112 to provide adequate clearance for the rotary head 600 to couple to the lift arms 110, 112. A plurality of electrical, hydraulic, and/or pneumatic systems could be utilized to transition the second coupler 120 to the Θ degrees relative to the respective lift arm 110, 112 and this disclosure should not be limited to any one system. Rather, a person having skill in the relevant art understands how each of these systems could be used to rotate the second coupler 120.

While a draper head 300 and rotary head 600 are shown and described herein, this disclosure is not limited to these particular-style heads. Draper or rotary style heads are only a couple of the many potential types of heads that can be coupled to the work machine 100. Accordingly, this disclosure should not be limited to any particular type of head.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A windrower comprising:
   a frame at a front end of the windrower;
   a cab coupled to the frame;
   a plurality of controls disposed in the cab for controlling the windrower;
   a lift arm having a first end and a second end, the first end being pivotally coupled to the frame, wherein the lift arm includes a transverse bend defined at a location between the first and second ends;
   a first coupler coupled to the second end of the lift arm;
   a second coupler coupled to the lift arm between the first and second ends;
   an upper link bracket coupled to the frame at the front end;
   a latching mechanism coupled to the second coupler, the latching mechanism adapted to removably couple a draper head to the lift arm; and
   an intermediate coupler coupled to the draper head, the intermediate coupler adapted to be removably coupled to the latching mechanism;
   wherein, the first coupler is configured to couple the frame to a rotary-style head and the second coupler is configured to couple the frame to the draper head with the latching mechanism and the intermediate coupler.

2. The windrower of claim 1, further wherein the second coupler pivots about a first axis.

3. The windrower of claim 1, further comprising an upper link coupled at a base end to the upper link bracket and having a distal end movable relative to the base end for coupling to the draper head or the rotary head.

4. The windrower of claim 1, further comprising a latch pin through the intermediate coupler, wherein the latching mechanism is adapted to removably couple to the latch pin.

5. A windrower comprising:
a frame at a front end of the windrower;
a cab coupled to the frame;
a plurality of controls disposed in the cab for controlling the windrower;
a lift arm having a first end and a second end, the first end being pivotally coupled to the frame, wherein the lift arm includes a transverse bend defined at a location between the first and second ends;
a first coupler coupled to the second end of the lift arm; and
a second coupler coupled to the lift arm along the transverse bend and between the first and second ends;
an intermediate coupler that is removably coupled to the second coupler;
wherein, the first coupler is configured to couple the frame to a rotary-style head; and
wherein, the second coupler configured to couple the frame to a draper-style head.

6. The windrower of claim 5, further comprising a latching mechanism mechanically coupled to the second coupler.

7. The windrower of claim 6, wherein the second coupler is pivotal about a pin into a carry position.

8. The windrower of claim 5, wherein the intermediate coupler couples the draper-style head to the second coupler.

9. The windrower of claim 8, further comprising a latching mechanism coupled to the second coupler, the latching mechanism adapted to removably couple the draper-style head to the lift arm with the intermediate coupler.

10. A windrower comprising:
a lift arm having a first end and a second end and a transverse bend defined in the lift arm between the first end and the second end;
a first coupler coupled to the second end of the lift arm and configured to be coupled to a rotary head;
a second coupler coupled to the lift arm between the first and second ends and configured to be coupled to a draper head; and
an intermediate coupler coupled to the draper head, the intermediate coupler adapted to be removably coupled to the second coupler;
wherein, the second coupler is coupled to the lift arm along the transverse bend.

11. The windrower of claim 10, further comprising a latching mechanism coupled to the second coupler, the latching mechanism adapted to removably couple the draper head to the lift arm with the intermediate coupler.

12. The windrower of claim 11, further wherein the intermediate coupler has a latch pin defined therein and the latching mechanism is coupled to the intermediate coupler at the latch pin.

13. The windrower of claim 10, further wherein the intermediate coupler defines a guide surface that substantially restricts rotation of the intermediate coupler relative to the lift arm when the intermediate coupler is coupled to the second coupler.

* * * * *